United States Patent
Miliavsky et al.

(10) Patent No.: US 9,319,310 B2
(45) Date of Patent: Apr. 19, 2016

(54) DISTRIBUTED SWITCHLESS INTERCONNECT

(71) Applicant: Compass Electro Optical Systems Ltd., Netanya (IL)

(72) Inventors: Vladimir Miliavsky, Petah Tikva (IL); David Chairman, Zoran (IL); Niv Margalit, Ramat Hasharon (IL); Iftah Meyron, Kiryat Ono (IL); David Zelig, Zichron Yaakov (IL); Alexander Zeltser, Netanya (IL)

(73) Assignee: Compass Electro Optical Systems Ltd., Netanya (IL)

( * ) Notice: Subject to any disclaimer, the term of this patent is extended or adjusted under 35 U.S.C. 154(b) by 69 days.

(21) Appl. No.: 13/678,382

(22) Filed: Nov. 15, 2012

(65) Prior Publication Data
US 2014/0133493 A1    May 15, 2014

(51) Int. Cl.
*H04L 12/721* (2013.01)
*H04L 12/931* (2013.01)
*H04L 12/933* (2013.01)

(52) U.S. Cl.
CPC .............. *H04L 45/44* (2013.01); *H04L 49/00* (2013.01); *H04L 49/15* (2013.01)

(58) Field of Classification Search
CPC ....... H04L 45/22; H04L 45/28; H04L 45/586; H04L 45/60; H04L 49/3027; H04L 49/3045
USPC .......... 370/470–475, 389–401, 406; 710/301
See application file for complete search history.

(56) References Cited

U.S. PATENT DOCUMENTS

| | | | |
|---|---|---|---|
| 6,154,449 A | 11/2000 | Rhodes et al. | |
| 2007/0233927 A1* | 10/2007 | Fallah-Adl | H05K 7/1492 710/301 |
| 2008/0068989 A1 | 3/2008 | Wyk et al. | |
| 2010/0061272 A1 | 3/2010 | Veillette | |
| 2010/0098101 A1* | 4/2010 | Drottar et al. | 370/402 |
| 2011/0164508 A1* | 7/2011 | Arai | H04L 45/00 370/245 |
| 2011/0320906 A1* | 12/2011 | Murakami et al. | 714/752 |
| 2011/0321161 A1* | 12/2011 | Shanmugavadivel et al. | 726/22 |
| 2012/0045204 A1* | 2/2012 | Beshai | 398/45 |
| 2013/0194927 A1* | 8/2013 | Yamaguchi et al. | 370/235 |
| 2013/0258839 A1* | 10/2013 | Wang et al. | 370/221 |

OTHER PUBLICATIONS

International Search Report and Written Opinion issued by the International Searching Authority for International Application No. PCT/IB13/03051 mailed on Jul. 30, 2014 (8 pages).

* cited by examiner

*Primary Examiner* — Edan Orgad
*Assistant Examiner* — Emmanuel Maglo
(74) *Attorney, Agent, or Firm* — Wilmer Cutler Pickering Hale and Dorr LLP

(57) ABSTRACT

A distributed switchless system characterized by full mesh connectivity is disclosed. The full mesh distributed switchless system allows direct and indirect communication between a source node and a destination node. In direct communication, data propagates via links connecting the source and destination nodes. In indirect communication, data is first sent to an intermediate node via links connecting the source and intermediate nodes. The intermediate node sends the data to the destination node via links connecting the intermediate node and the destination node. The traffic can be divided into all available links across the nodes, rather than only the links connecting the source and destination nodes. Because indirect communication uses more links compared to direct communication, the traffic in each link is smaller. Consequently, the switchless distributed interconnect system can operate with fewer links between any two nodes and links with smaller bandwidth.

21 Claims, 19 Drawing Sheets

DISTRIBUTED SWITCHLESS INTERCONNECT

BACKGROUND OF THE INVENTION

1. Field of the Invention

The present disclosure relates to a method for transmitting data in a full-mesh network. Specifically, the disclosure relates to distributing and transmitting the data via multiple links and multiple intermediate nodes.

2. Description of Related Art

High speed systems require full connectivity between processing engines. A processing engine ("node") has a certain processing capacity. A processing engine is typically associated with a specific set of hardware resources limited in their physical location, for example, a specific line card, a shelf or a rack.

Traditionally, inter-node connectivity is used in the communication and computing industry with one of two methods: (i) switch connectivity and (ii) full mesh connectivity. An example of switch connectivity is Clos switching that uses a switching stage between nodes. Each node that wants to send data to another node sends the data to a switch. The switch sends the data to either a single destination node or multiple destination nodes (broadcast or multicast). One disadvantage of the switch connectivity is that the switch size and complexity increases as the number of nodes increases. A switch with a larger number of nodes requires more processing power, for example, to accommodate for switch overhead and for inefficiency in scheduling traffic from multiple nodes to the same destination node.

In full mesh connectivity, each node is connected with all the other nodes (point-to-point connectivity). When a source node sends data to a destination node, it sends the data over links directly connected to the destination node. In case of multicast traffic, a source node multiplies the data locally and sends a copy to each destination node via links directly connected to the destination node. The full mesh connectivity has certain disadvantages. For example, when an additional node is added to the system, at least one link from every existing node is unplugged from each other and plugged into the new node. The number of links to be re-plugged is equal to or larger than the number of existing nodes, or new links must be added.

In a typical full mesh connectivity, a system of N number of nodes, where each node has capacity $C_N$ and M number of links, requires that each node can accommodate total capacity of at least $(N-1)*C_N$. In this case, the number of links can be at least $(N-1)*C_N/C_L$, where $C_L$ corresponds to a single link capacity. In addition, once N nodes are connected in full mesh, adding additional nodes to the system downgrades the performance, unless the total number of links M per node increases.

SUMMARY

The present disclosure relates to a full mesh network, where a source node transmits data to multiple intermediate nodes and where the multiple intermediate nodes send the data to a destination node. The present disclosure also relates to a method of sending data using a plurality of intermediate nodes in a full mesh network.

In one aspect of the present disclosure, a method includes receiving by a first node in a full mesh distributed switchless interconnect system data indicating a destination node. The method also includes determining by the first node if the first node is the destination node. The method further includes processing the data by the first node if the first node is the destination node in the full mesh distributed switchless interconnect system. The method also includes determining by the first node, if the first node is not the destination node, to send the data to the destination node or to an intermediate node in a full mesh distributed switchless interconnect system and transmitting the data either to the destination node or to the intermediate node, based on the determination by the first node, if the destination node is not the first node.

In another aspect of the present disclosure, the data may comprise at least one master cell which comprises at least one packet. The at least one master cell can contain a header with a queue sequence number. Processing the data may include ordering at least one master cell based on a queue sequence number, extracting at least one packet, and sending the at least one packet to a processing unit coupled to the first processing engine.

Additional features may appear in aspects of the present disclosure. For example, the method further may include forming by the first processing engine at least one master cell comprising at least one packet. The method may further include determining a size of the master cell based on at least one of a link capacity, a processing engine capacity, a number of links, and a number of intermediate processing engines. Forming may include adding the at least one packet to the at least one master cell until a timeout parameter expires. Forming may also comprise adding the at least one packet to the at least one master cell based on an amount of available packets and an urgency of delivery.

In an aspect of the present disclosure, the method may further include forming by the first processing engine a plurality of master cells from the data. The first processing engine may also receive the data from a processing unit coupled to the first processing engine. Transmitting may include transmitting the plurality of master cells, containing different packets, to a plurality of intermediate processing engines.

In another aspect of the present disclosure, the method may include broadcasting by the first processing engine that a first link coupling the first processing engine to a second processing engine is inactive, if the first processing engine fails to receive a keepalive message from the second processing engine. The method may also include sending by the first processing engine a first keepalive message to a second processing engine. The method may further include broadcasting by the first processing engine that a first link coupling the first processing engine to the second processing engine is inactive, if the first processing engine fails to receive a message from the second processing engine in response to the first keepalive message. Alternatively, the method may include sending by the first processing engine a first keepalive message to a second processing engine. The method may further include broadcasting by the first processing engine that a first link coupling the first processing engine to the second processing engine is inactive, if the first processing engine receives a message from the second processing engine indicating a failure to receive the first keepalive message.

In an aspect of the present disclosure, in a full mesh distributed switchless interconnect system, an apparatus includes a processing unit and a first processing engine coupled to the processing unit and configured to receive via the full mesh distributed switchless interconnect system data indicating a destination processing engine. The first processing engine is configured to process the data and to deliver the processed data to the processing unit, if the first processing engine is the destination processing engine in the full mesh distributed switchless interconnect system. On the other hand, the first processing engine is configured to transmit the data to the destination processing engine or to an intermediate processing engine in the full mesh distributed switchless interconnect system, if the first processing engine is not the destination processing engine.

In another aspect of the present disclosure, the first processing engine may comprise an assembly unit configured to form at least one master cell comprising at least one packet based on the received data, if the received data is received from the processing unit.

DETAILED DESCRIPTION

According to aspects of the present disclosure, a multi-chassis router with passive interconnect and distributed switchless switching is provided. This system connects multiple nodes in full mesh and allows direct and indirect transfer of data. The multi-chassis router can also be used for connecting computational processors in a multi-cluster computing environment. In addition, the multi-chassis router can connect computational processors and storage processors. The router uses a Passive Connectivity Optical Module ("PassCOM") to simplify the process of setting up or updating a full mesh network. The PassCOM is a passive device, not containing electronic components.

Physical Node Structure and Node Functions

Figure 1:
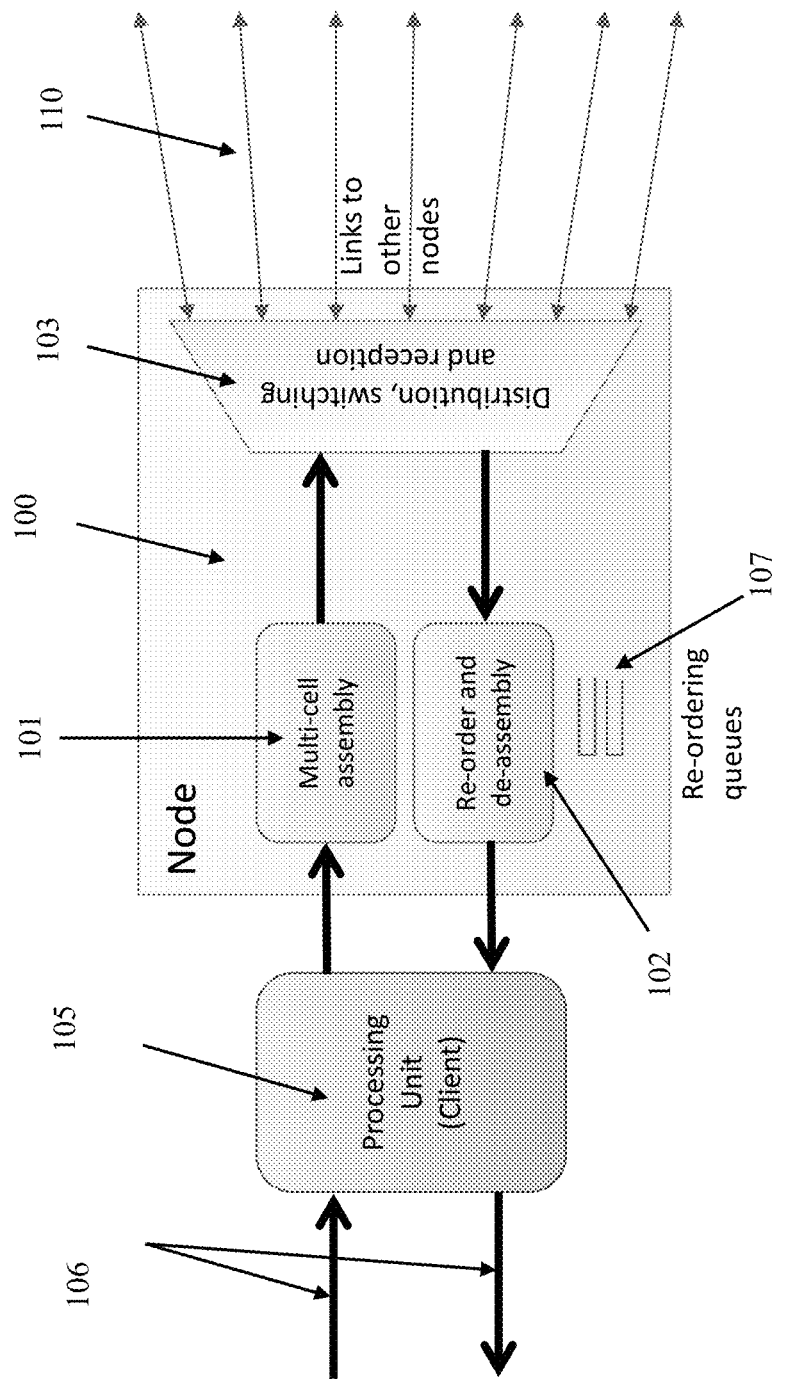
FIG. 1 shows a node connecting a processing unit to a network according to aspects of the present disclosure.

FIG. 1 shows node 100 connecting processing unit 105 to a network. Node 100 is connected to processing unit 105 and connected to other nodes using links 110. Using links 110, node 100 provides connectivity between processing unit 105 and other processing units distributed across line cards, shelves, racks, or other physical locations.

Processing unit 105 is a client of node 100. In a communication system, processing unit 105 can be, for example, a network processor connected to external interfaces 106. Processing unit 105 examines packets received from interfaces 106 and determines the destination of the received packets based on routing and/or switching operations. Other packet information, e.g., Quality of Service (QoS), queuing, and modifications, can also be used to determine the destination. The destination can be a single processing unit for unicast communication or multiple processing units for multicast communication.

When packets of data from processing unit 105 arrive, the packets may be sent to switching unit 103, which then sends the packets to other nodes. In this case, the packets are directly sent to other nodes. Assembly unit 101 may write a packet sequence number on the header of the packet sent to other nodes. Alternatively, when packets arrive, assembly unit 101 may assemble the packets into a master cell and send the master cell to other nodes through switching unit 103. Assembly unit 101 may write a master cell sequence number to the header of the master cell.

Figure 2:
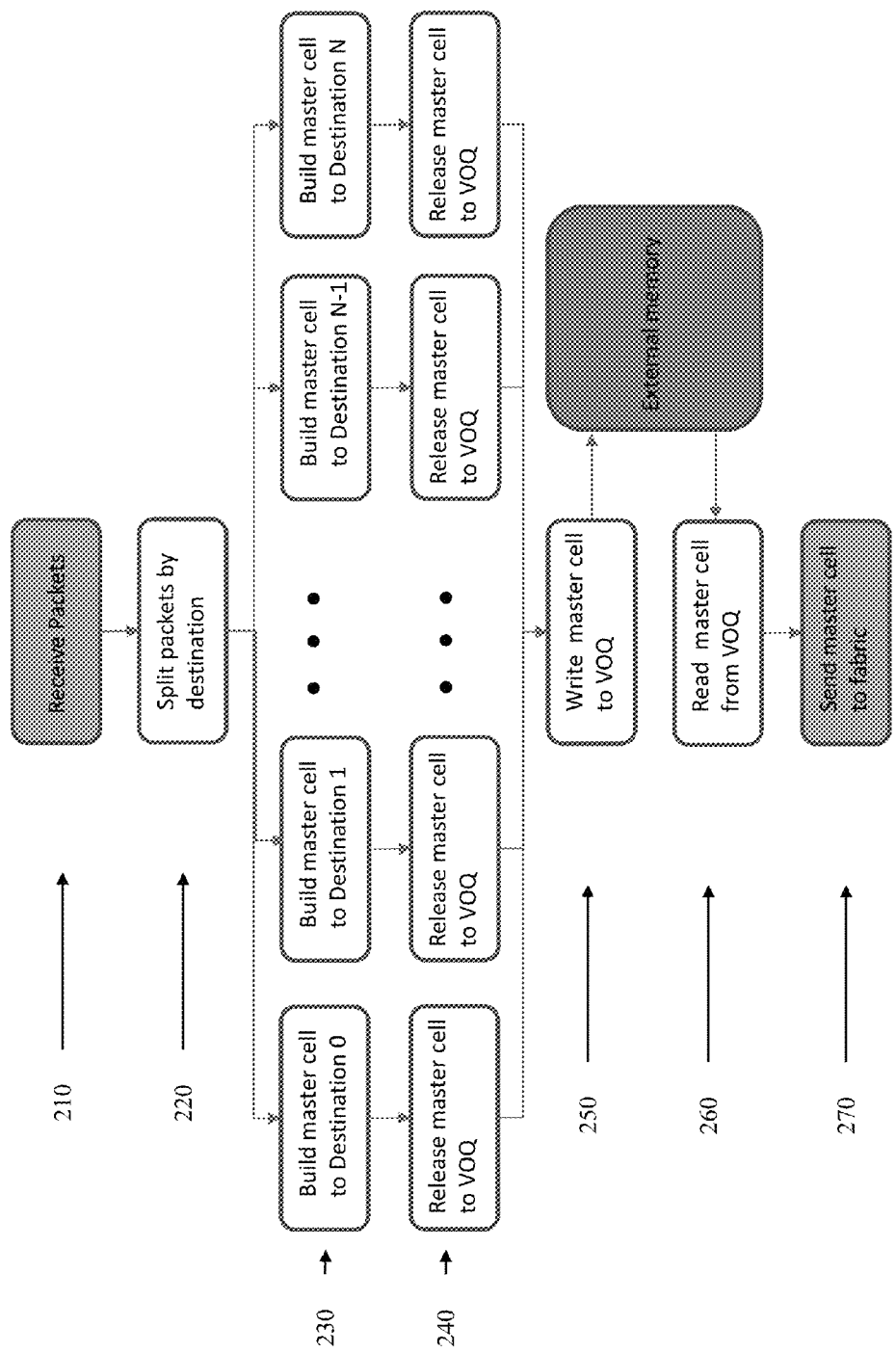
FIG. 2 shows a flowchart of assembling master cells according to aspects of the present disclosure.

FIG. 2 shows a flowchart of assembling master cells. Assembly unit 101 receives packets (step 210) and splits the packets based on their destination (step 220). Assembly unit 101 adds each of the packets to a master cell containing packets for the same destination (step 230). If there is an existing master cell that is not completely filled, assembly unit 101 adds the packet to the existing master cell. Otherwise, assembly unit 101 forms a new master cell and releases the filled master cell to virtual output queuing (VOQ) (step 240). If the packet exceeds the length of the master cell, the assembly unit fills and sends the filled master cells, and the remaining portion of the packet is placed in a next master cell. The next master cell waits for next packets.

The released master cell is written to VOQ in an external memory (step 250). The VOQ logic holds at least one queue per destination node. So in case of backpressure (build-up of data at a particular link) to a specific destination, only the transmission of master cells in the queue or queues related to the specific destination will be stopped. Other master cells in the queues for other destinations can continue to be sent. When a master cell is ready to be sent, the master cell is read from the memory (step 260) and sent to other nodes (step 270). The VOQ may be managed independently by the master cell generation process, in which the assembly unit holds just the current master cell for each destination and the VOQ external buffers are managed externally. The assembly unit then pulls from the VOQ packets based on the release rate of the master cells toward the switching unit 103.

A master cell may contain partial payload of a packet. In this case, assembly unit 101 adds the remainder of the packet to the next master cell. Assembly unit 101 may hold multiple queues per destination node, each queue representing a different class of service (COS).

The use of master cells enables efficient inter-switch memory management and queuing management because master cells can be made in one size. Using the fixed-size cells provide some performance advantages. For example, fixed-size cells enable efficient processing and external memory management as it is more efficient to write to and read from dynamic random-access memory (DRAM) in relatively large block sizes while avoiding DRAM bank contention. Typically, the average packet size is smaller than the optimal block size, which is matched by the size of master cells. Furthermore, large packets can be divided into multiple master cells when links have small bandwidth. Using multiple links to send multiple master cells allows the destination node to receive the whole packet in parallel with reduced delay and jitter compared to the use of a single lane. In addition, queue and buffer management is simpler when the native processing unit is limited in size, since the number of descriptors can be made lower compared to a large number of small packets. The use of master cells also simplifies the accounting required for balancing link load since the accounting can be made based on fixed size cells rather than variable packet sizes.

When a master cell is full, the master cell is delivered to switching unit 103. Switching unit 103 determines which links to use for sending the master cell to its destination. If there is no backpressure from switching unit 103 for the specific destination/COS combination, the master cell may be sent immediately to its destination.

The master cell size can vary. For example, the master cell size can be smaller for high priority COS to avoid excessive delays arising from filling up the master cell with additional packets. The master cell size can also vary depending on the available bandwidth in a network. The available bandwidth can be determined by the number of nodes and the number of links. Assembly unit 101 may also employ timeouts and send partially filled master cells to avoid excessive delays. In addition, assembly unit 101 may release partially filled master cells to avoid consumption of unnecessary bandwidth on the interconnect links.

Switching unit 103 can also receive data from other nodes. Switching unit 103 determines if the destination of the data is local processing unit 105 or a processing unit of another node. If the final destination is a processing unit of another node, switching unit 103 sends the data to the destination node or another intermediate node.

When switching unit 103 receives data for a local processing unit, switching unit 103 passes the data to reordering and de-assembly unit 102. Reordering and de-assembly unit 102 stores the data in reordering queue 107 in a memory. If the data may be in a form of master cell, reordering and de-assembly unit 102 reorders and de-assembles the master cells. The reordering and de-assembly processes may operate separately on two separate devices or on one device.

Figure 3:
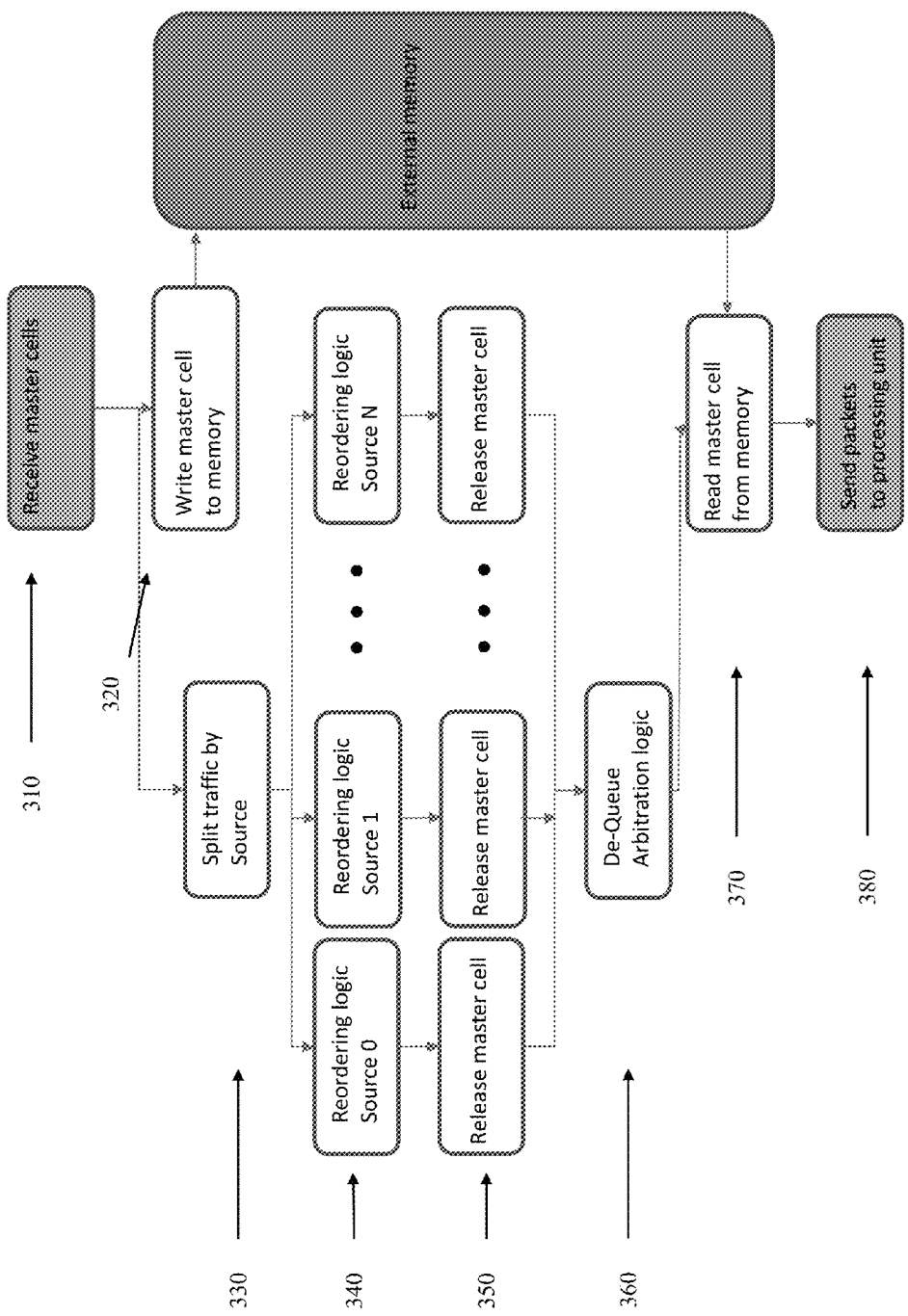
FIG. 3 shows a flowchart of processing received master cells according to aspects of the present disclosure.

FIG. 3 shows a flowchart of processing the received master cells in reordering and de-assembly unit 102. When reordering and de-assembly unit 102 receives master cells (step 310), reordering and de-assembly unit 102 may store the master cells in reordering queue 107 in a memory (step 320). Reordering and de-assembly unit 102 splits master cells by their sources based on master cell sequence numbers, defined at the nodes from which the master cells originate. (step 330). Reordering and de-assembly unit 102 compares the master cell sequence numbers of the received master cells and correctly places them in the queue using reordering logic and releases the reordered master cells (step 340).

Figure 4:
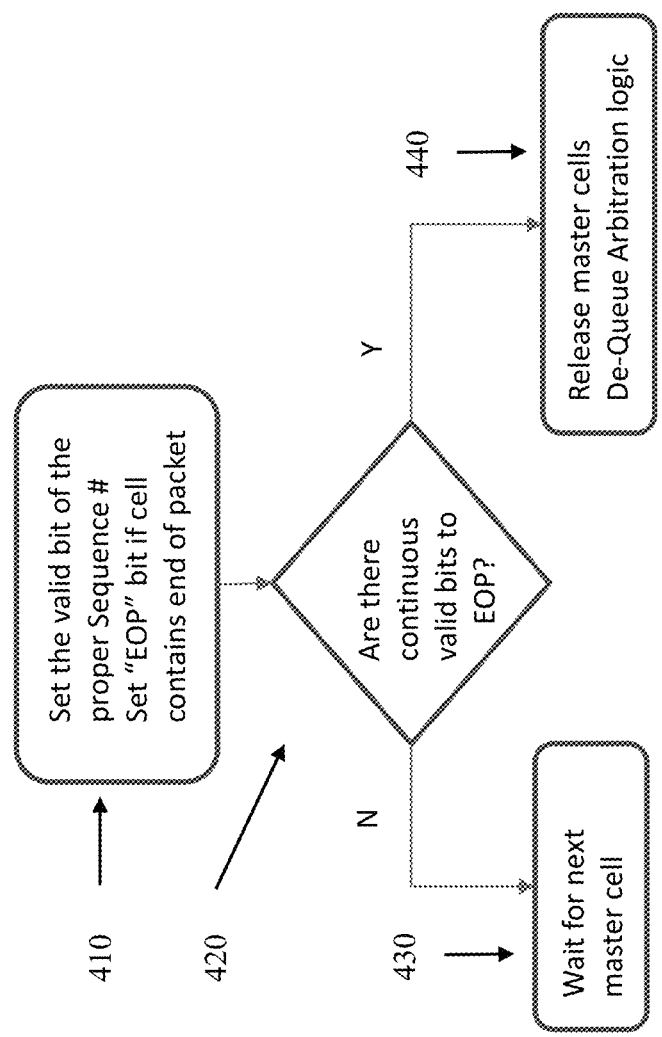
FIG. 4 shows a flowchart of reordering logic according to aspects of the present disclosure.

FIG. 4 shows a flowchart of the reordering logic of step 340. Each master cell has its corresponding bit, which is determined based on the master cell sequence number. Reordering and de-assembly unit 102 sets a bit corresponding to the received master cell (step 410). Setting the bit may be done by changing the bit from 0 to 1, indicating that the master cell is received. If the master cell contains an end of packet (EOP), reordering and de-assembly unit 102 sets an additional bit to indicate an EOP (step 410).

Figure 5:
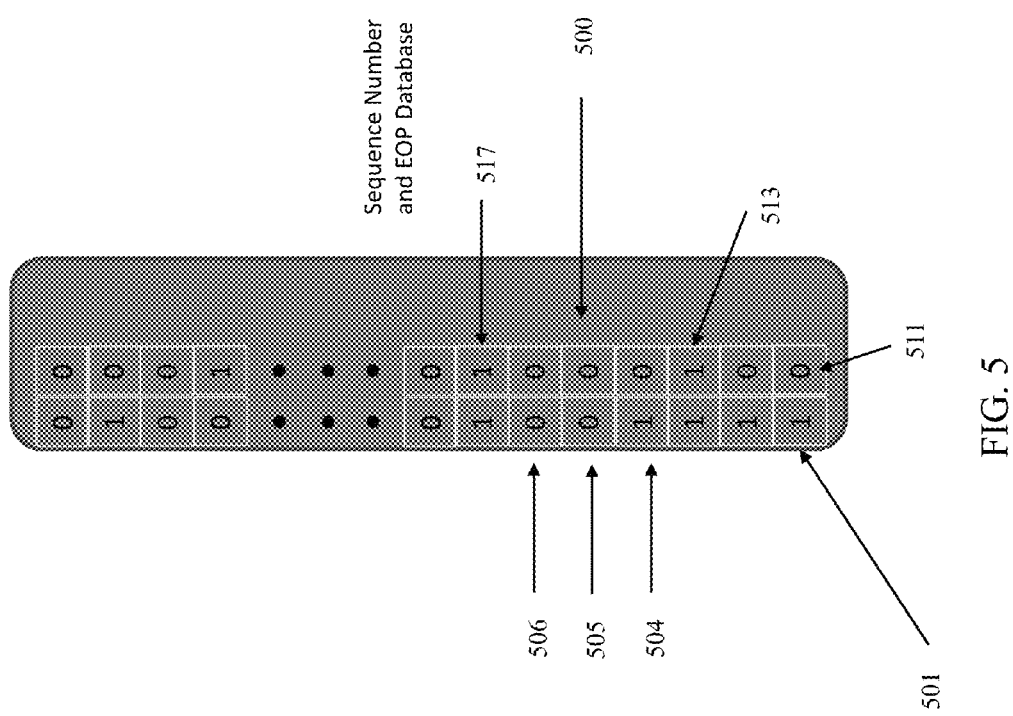
FIG. 5 shows a sequence number and end-of-packet database with bits corresponding to master cells according to aspects of the present disclosure.

FIG. 5 shows a sequence number and EOP database with bits corresponding to master cells. In sequence number database 500, there are two types of bits: a reception bit and an EOP bit. In one embodiment, the bits in the first column are the reception bits, indicating whether corresponding master cells arrived. The bits in the second column are the EOP bits, indicating whether the corresponding master cells contain an EOP. In an embodiment, a reception bit with value 0 indicates that its corresponding master cell has not arrived, and the reception bit with value 1 indicates that its corresponding master cell has arrived. A EOP bit with value 1 indicates that its corresponding master cell contains an end of packet, and an EOP bit with value 0 indicates otherwise.

Reception bit 501 is a bit in the head of the queue, and reception bit 504 is the last bit in the queue without a missing prior bit. If an EOP exists between reception bit 501 and reception bit 504, reordering and de-assembly unit 102 knows that an entire packet, ending with the EOP, is received. For example, EOP bit 513 shows that there is an EOP between reception bits 501 and 504. In contrast, having reception bits with 0's in front of the EOP indicates that not all master cells containing the packet have arrived. In front of EOP bit 517, for instance, there are reception bits 505 and 506 with 0's. Thus, the entire packet, ending on a corresponding master cell of EOP bit 517, has not arrived.

Reordering and de-assembly unit 102 checks if all master cells containing a packet have arrived by checking the reception bits (step 420). If not all master cells containing the packet have arrived, then reordering and de-assembly unit 102 waits for a next master cell (step 430). If all master cells containing a packet have arrived, reordering and de-assembly unit 102 releases the master cells (step 440). Reordering and de-assembly unit 102 may also release master cells when a timeout expires.

The released master cells are de-queued using an arbitration logic (step 360). The de-queue arbitration logic selects master cells with the highest priority among all master cells that are ready to be sent to processing unit 105. Reordering and de-assembly unit 102 reads the master cells from the memory and de-assembles the master cells to the original packets (step 370), which is then sent to processing unit 105 (step 380). The reordering process may hold an internal queue 107 for each source/COS combination. The internal queues can be, for example, buffers located in the node.

A system may use a simplified embodiment, where a packet is not assembled into master cells with other packets. Packets may not be divided into multiple master cells. Also, a master cell may contain one packet. In this case, reordering and de-assembly unit 102 uses the same logic as described above, but without the need to mark the EOP bit. The same logic is used for re-ordering purposes only.

Each master cell arrival time is recorded by reordering and de-assembly unit 102. After a master cell is sent to processing unit 105, reordering and de-assembly unit 102 sets a queue head sequence number to the master cell sequence number of the last master cell sent to processing unit 105. If a master cell is received with the master cells' sequence number lower than the queue head, the master cell is sent to processing unit 105 immediately after its de-assembly.

Processing unit 105 may further deploy QoS functions, such as traffic management and queuing. Processing unit 105 can create local copies, if needed, for multicast traffic. Processing unit 105 may also modify the formats of received packets and send them to interfaces 106. In a typical networking system, a packet format on the input interface may be different from the packet format on the output interface because of added information, such as routing headers and MPLS labels. In this case, some of the packet format modification is handled by a processing unit on the ingress line card and some of the header manipulation is done at a processing unit on the egress line card.

When node 100 indicates backpressure status to processing unit 105 due to temporary congestion in the distributed switchless interconnect system, node 100 may implement multiple QoS strategies. The backpressure may occur on all traffic or a portion of traffic for specific destinations or per priority.

One example strategy is to stop transmitting packets from processing unit 105 to node 100 in case of backpressure, regardless of whether the backpressure is per destination. Because the transmitting node does not send data to nodes that are congested during the backpressure period, head-of-line blocking may occur. Head-of-line blocking is a situation where traffic to all nodes is stopped due to congestion in traffic to a portion of the nodes. This occurs because packets that are on the head of the queue experience backpressure and block next packets to other nodes that are able to receive packets. Head-of-line blocking is not efficient and often highly undesirable.

If the backpressure is per priority, the node may allow only the high priority traffic and stop the lower priority traffic. This approach may be beneficial because it only requires a small number of queues on processing unit 105 and/or assembly unit 101.

Another strategy is to use multiple queues per destination node. When backpressure is received indicating congestion on routes to a specific node, processing unit 105 and assembly unit 101 can stop transmitting data to the specific node. Processing unit 105 and assembly unit 101 may allow transmitting specific priorities to the node. For example, only high priority traffic may be allowed. This strategy avoids the head-of-line blocking but requires higher complexity traffic management.

The logical separation between node 100 and processing unit 105 with regard to QoS management is for illustration only. According to alternative embodiments, assembly unit 101 and processing unit 105 may be a single physical device combining master cell assembly and queuing. A single physical device can reduce the load on processing unit 105.

In addition, assembly unit 101, reordering and de-assembly unit 102, and switching unit 103 may be composed of multiple physical devices with various types of interfaces. Each function can be implemented, for example, in FPGA, ASIC, or in combination to utilize the logical functions described in this disclosure.

Connecting Multiple Nodes

The distributed switchless interconnect system enables switchless, scalable node connectivity through physical full mesh connectivity. In some embodiments, the system uses internal inter-node switching. Specifically, the system allows transmission of data from a source node to a destination node using 1) links that connect directly the source and destination nodes and 2) intermediate nodes that receive data from the source node and reroute it to the destination node.

To connect N nodes in full mesh, each node with M links may divide its own M links to the other N−1 nodes. Thus, the number of nodes that can be connected in the system is less than or equal to the number of links plus one, N≤M+1. The links may or may not be divided evenly between the nodes. If all nodes have the same capacity, each node can connect to any other node using an equal number of links. The distributed switchless interconnect system may use optical links, electronic links or combination of the two between the nodes.

A node has a node capacity, for example, $C_N$. Each of the M links connected to the node has a link capacity, for example, $C_L$. $C_N$ is determined by the connection of the node to its corresponding processing unit that controls communication or other processes. For example, a node with 10 interfaces of 10 Gbps and a processing unit that can process all the interfaces has capacity $C_N$ equal to 100 Gbps.

In a typical full mesh system having one link between any two nodes, the ratio of the link capacity over the node capacity, $$\frac{C_L}{C_N},$$

for each link needs to be larger than 1 for enabling the network to handle the full processing capacities. Otherwise, the rate of processing by a node will exceed the rate of transfer using a link, thus blocking traffic. According to aspects of the present disclosure, traffic can be divided into multiple links. Thus, the communication system when the node has M links can be designed such that $$M \times \frac{C_L}{C_N} > 1.$$

The ratio, $$\frac{M \times C_L}{C_N},$$

is referred to as the local over-speed. When the local over-speed is larger than 1, the network is capable of handling the full processing capacity of processing units.

According to aspects of the present disclosure, a distributed switchless interconnect system has the effective switching capacity of N×M×$C_L$ with possible concurrent system input of N×$C_N$.

Each node can receive peak traffic from all other sources up to the bandwidth of M×$C_L$.

$$M \times \frac{C_L}{C_N}$$

represents the temporary available over-speed between the peak connectivity to the node's physical interface capacity. On each outgoing link, the node aggregates locally originated data with data received from other nodes. Then, the node sends the data to another node behind the link.

Figure 6:
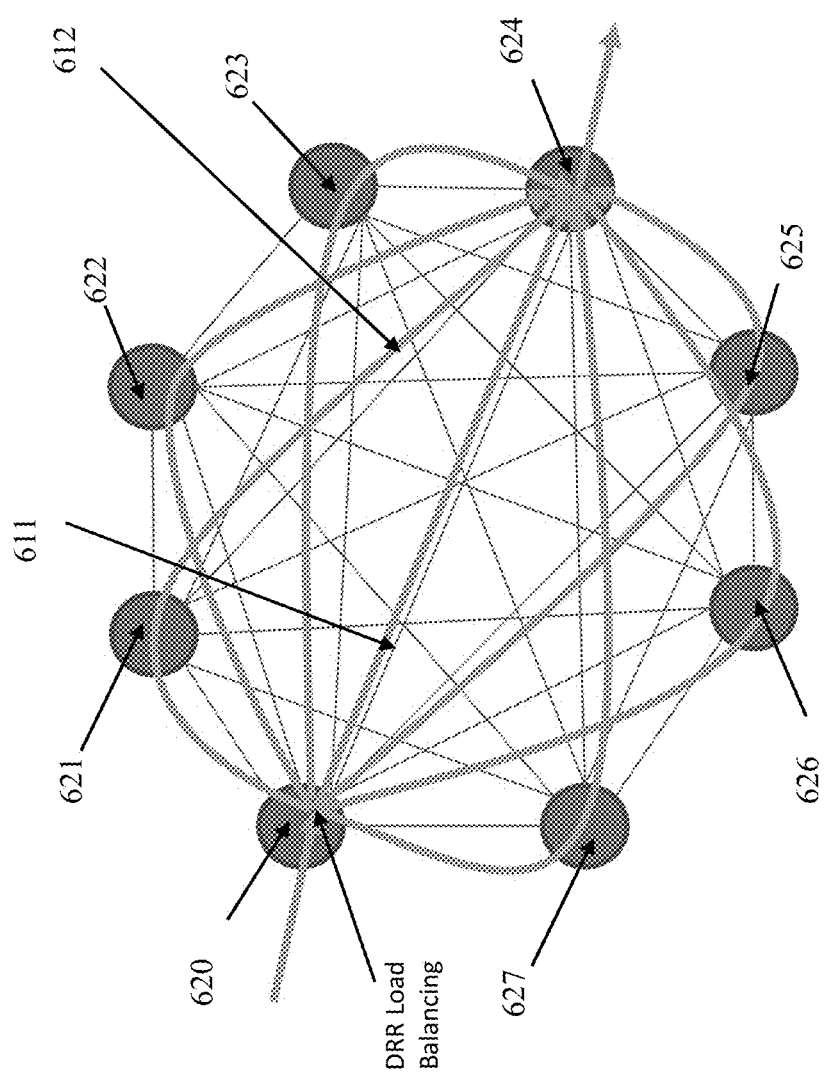
FIG. 6 shows data propagating from a source node to a destination node via direct and indirect links in a distributed switchless interconnect system according to aspects of the present disclosure.

FIG. 6 shows an example of a distributed switchless interconnect system according to aspects of the present disclosure.

Each line 612 in the figure represents one or more physical links connecting two nodes. In this embodiment, source node 620 sends data to destination node 624. Source node 620 may distribute the traffic evenly between all active links 612 so that the complete system load is evenly distributed. If all nodes distribute the traffic evenly, then global system load balancing can be achieved. The distributed switchless interconnect system can use Deficit Round Robin (DRR) or weighted DRR to distribute the traffic in case of partial backpressure within the system.

At least one link—link 611—directly connects source node 620 and destination node 624. Other links connect either source node 620 or destination node 624 to the intermediate nodes: nodes 621-623 and 625-627. The intermediate nodes receive the data from source node 620, identify node 624 as the destination node, and send the data to node 624. The intermediate nodes may send the data using the direct links to node 624. In this case, data is sent via two hops. A hop refers to a direct transfer from a node to another node, so two hops refer to having one intermediate node. A source node sends a packet to an intermediate node, which sends the packet to a destination node. Alternatively, the intermediate nodes can send the data to other intermediate nodes, so that the data is sent using more than two hops.

Figure 7:
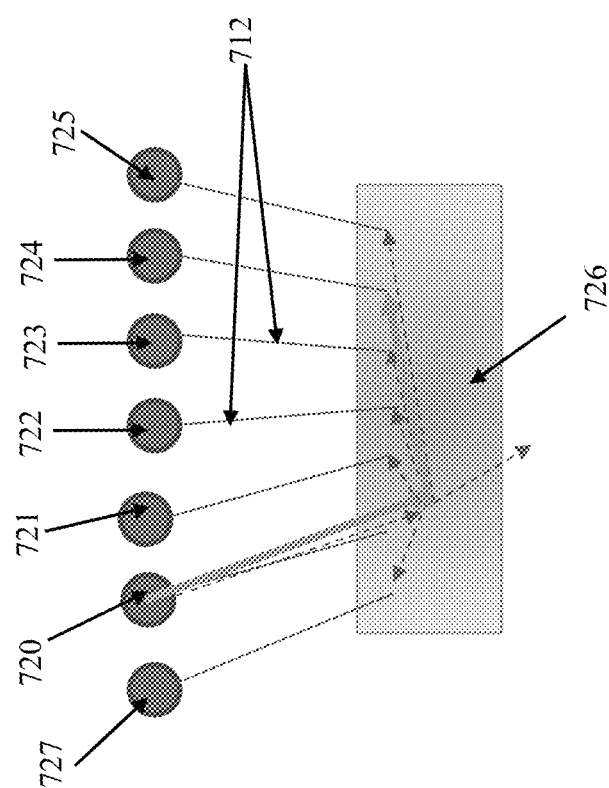
FIG. 7 shows a node receiving data and transmitting the data to another node in a distributed switchless interconnect system according to aspects of the present disclosure.

FIG. 7 shows node 726 of the distributed switchless interconnect system Links 712 connects node 726 with other nodes. Through links 712, node 726 is capable of receiving data from and sending data to other nodes. When node 726 receives data from other nodes, node 726 determines the destination of the data as indicated on the packet header inserted by the source node's processing unit. The packet header contains the destination node number.

If the destination is another node, node 726 functions as an intermediate node sending the data to the destination node. Node 726 receives data from source node 720 and sends the data to destination node 724. Node 726 may determine that the packet destination is the local node either explicitly by identifying the destination node number or implicitly by identifying that the packet is one hop, which may also be displayed in the packet header.

According to an embodiment of the disclosure, a distributed switchless interconnect system implements selective load balancing. For example, load balancing can be achieved by sending data to the destination only through intermediate nodes. Selective load balancing can be beneficial because it reduces arrival time differences coming from traffic flowing through different number of links. In an exemplary method of the selective load balancing, some links may be dedicated to specific traffic priority.

According to another embodiment of the disclosure, the distributed switchless interconnect system may first choose to transmit directly to the destination node and may use intermediate nodes only if direct links are overloaded. Such selective load balancing can be beneficial because it minimizes the delay for the traffic going over the direct links. It may be employed only for traffic belonging to specific traffic priority.

Multi-level priority can be used to avoid backpressure and congestion across nodes at each load balancing entity. Backpressure can arise at multiple levels, such as global backpressure, per destination node backpressure, and per destination interface backpressure. Backpressure can also be per priority. Global backpressure controls all traffic from the forwarding node to the switching node. Backpressure at the destination node controls the traffic destined to specific node. Per destination interface backpressure controls the traffic destined to a specific interface of a specific node. It can be per priority or higher granularity as well. An example of higher granularity QoS is using a queue for a combination of destination port and COS, or higher granularity such as per service queue.

Figure 8:
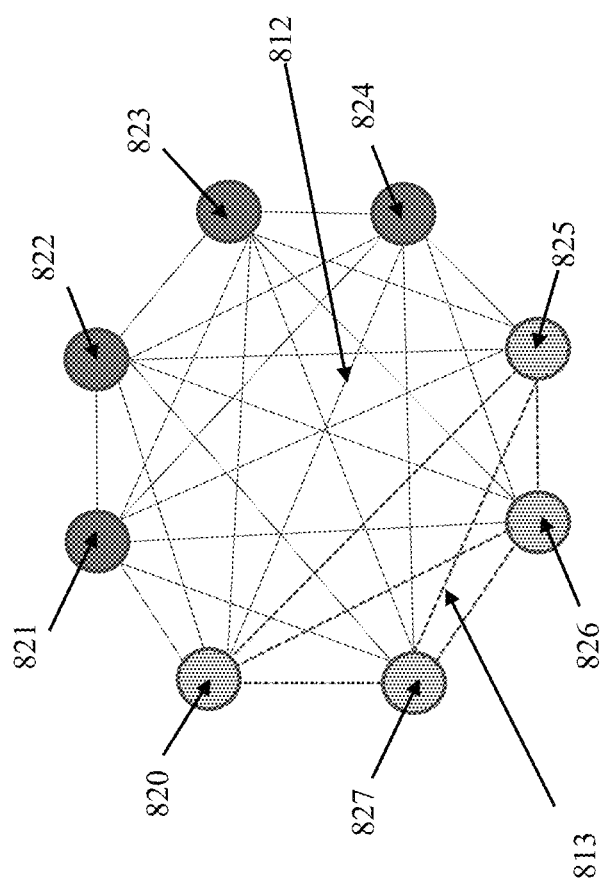
FIG. 8 shows a distributed switchless interconnect system with links of different capacities according to aspects of the present disclosure.

Distributed Switchless Interconnect System with Varying Number of Links and Link Capacities According to some embodiments of the disclosure, the system can support nodes with different number of links and different link capacity. FIG. 8 shows a distributed switchless interconnect system with links of different capacities. In FIG. 8, dashed lines 813 among nodes 820, 825, 826, and 827 represent links with higher capacities. Nodes with higher capacity links can create high speed connectivity with the higher capacity links and lower speed connectivity with lower capacity links.

Figure 9:
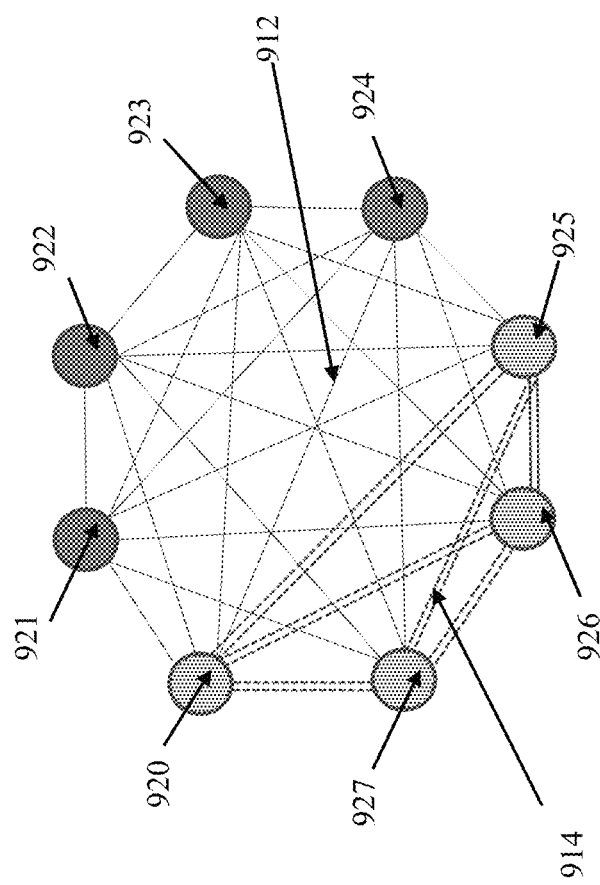
FIG. 9 shows a distributed switchless interconnect system with different number of links between nodes according to aspects of the present disclosure.

FIG. 9 shows a distributed switchless interconnect system. In FIG. 9, double dashed lines 914 among nodes 920, 925, 926, and 927 represent higher number of links. The nodes with higher number of links can creates any-to-any connectivity with the higher total capacity, while maintaining connectivity to the other nodes which has lower number of links.

Rerouting Traffic to Avoid an Inactive Link

Because traffic between a source node and a destination node is not limited to a specific link, the system can perform even when a certain link is inactive or congested. The traffic can be rerouted to use remaining functional links. According to an embodiment of the disclosure, all nodes in the system send keepalive messages to all other nodes at every fixed interval. Alternatively, a link failure can be detected by other means as well, for example, loss of light on optical links.

A node will fail to receive a keepalive message, when a link fails or when the link is congested. The receiving node may send a message to a node transmitting the keepalive message when the receiving node fails to receive the keepalive message. The message from the receiving node reports that the link is inactive. Alternatively, a receiving node may send a return message acknowledging the receipt of the keepalive message. When the transmitting node does not receive the return message in response to the first keepalive message, the transmitting node also detect that the link is inactive.

When an inactive link is detected, two messages can be broadcasted. The receiving node of the inactive link may broadcast a message to all other nodes indicating not to send data using the inactive link. As explained below, the transmitting node of the inactive link may also broadcast the same message to all the other nodes indicating to other nodes not to pass data using the inactive link.

When the inactive link becomes active, both the receiving node and the transmitting node of the link may broadcast two separate messages indicating that the link is active. By having the messages indicating the link state change sent from two different sources, the system increases the reliability of delivery of the messages.

Figure 10:
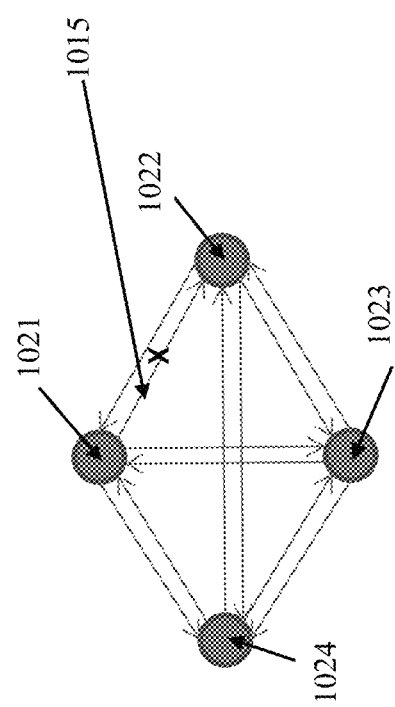
FIG. 10 shows a distributed switchless interconnect system with a broken link according to aspects of the present disclosure.

FIG. 10 shows an example of a distributed switchless interconnect system with an inactive link. In this example, a link from node 1021 to node 1022 is inactive. First, node 1022 identifies that no keepalive messages are received from node 1021. Then node 1022 sends a message to node 1021 indicating that the link between them is inactive. Node 1022 sends a broadcast message to all nodes indicating not to send data to node 1022 through node 1021. Node 1021 also sends the same broadcast message to all the other nodes. All of the other nodes update their dynamic traffic distribution logic to stop sending data to node 1022 through node 1021.

The dynamic traffic distribution logic uses the status of the links and status of buffers across the system, made available by the backpressure mechanism, to distribute the traffic across the system as uniformly as possible. Typically, global load balancing is achieved when each source node distributes as equally as possible the traffic to each destination based on the available links. The available links may include both direct links and indirect links through intermediate nodes. The dynamic traffic distribution logic, however, sends smaller portions of the traffic through indirect links if fewer indirect links are available. The dynamic traffic distribution logic uses Weighted Round Robin to control the portions of the traffic delivered to a destination through multiple routes. When a node in the network sends data to another node, the source node avoids using the link from node 1021 to 1022 and redistributes the data using other functional links.

The traffic distribution logic may hold a table listing the availability of every link. An example of such table includes a row per destination node. Each row contains the list of nodes which are available as intermediate nodes for a destination with a list of the links for each such intermediate node. The table may also include a list of directly connected links for each destination. Every link in the table can be marked with its source and destination nodes. This table may include both the direct links and the indirect links to the destination.

The state of each link in the table can be updated automatically, as described above, or manually by a control plane. A control plane is a process running on the nodes' CPUs and controls the operation of the system. The inputs for the control plane may be an operator configuration commands and hardware indications on the system status. The automatic update may be useful for detecting and repairing errors in the system, and the manual update may be useful for maintenance.

The control plane may disable or enable links when maintenance is expected on specific links. When performing maintenance or upgrades, an operator may manually disable a particular link by updating the table manually. After completing the maintenance, the operator can update the table and enable the link. When multiple links need to be upgraded, the links may be replaced one by one following the sequence above. This functionality may simplify the process of introducing additional nodes.

PassCOM

According to aspects of the present disclosure, a passive connectivity optical module is provided. A PassCOM makes it easy to connect multiple nodes in full mesh and to add a node to an existing full mesh network. The physical shape or connecting interphase of a PassCOM may be similar to a traditional switch. However, unlike a traditional switch, a PassCOM is a passive device, not containing electronic components.

Figure 11:
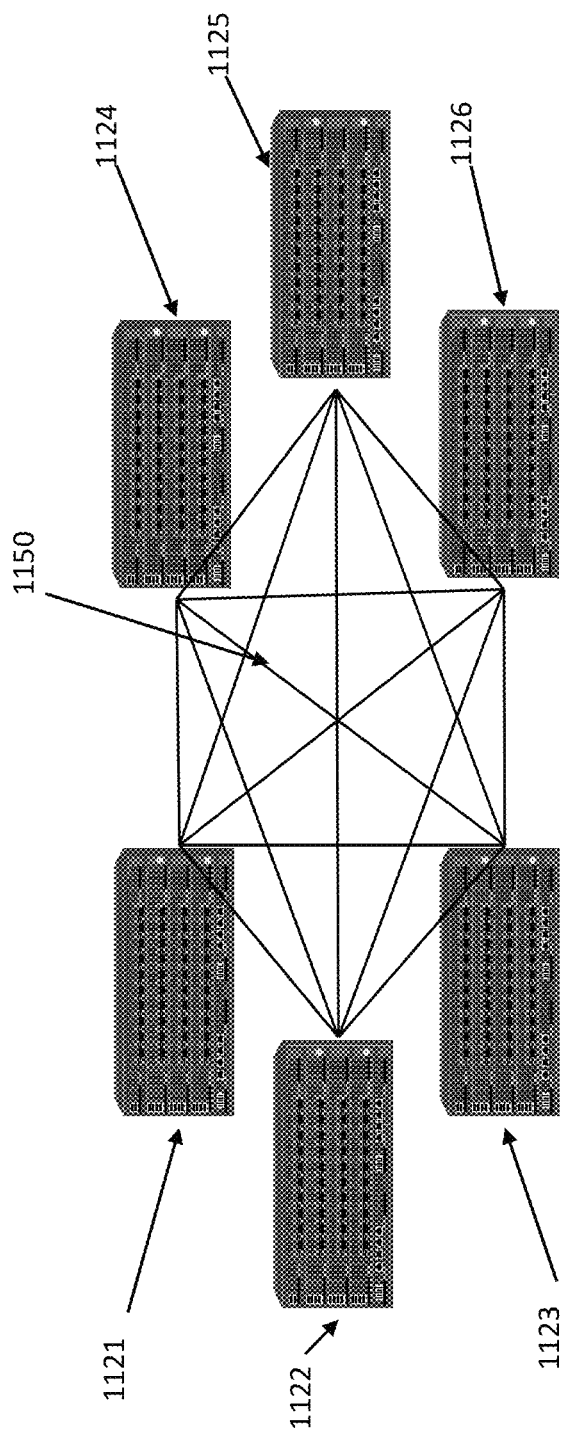
FIG. 11 shows a system connected in full mesh.

In FIG. 11, six nodes 1121-1126 are connected in full mesh. Full mesh connectivity requires at least N(N−1)/2 number of links 1150, where N is the number of nodes. Having N(N−1)/2 links to connect nodes in full mesh could make it difficult to physically set up a system and to add a node to an existing system.

Figure 12:
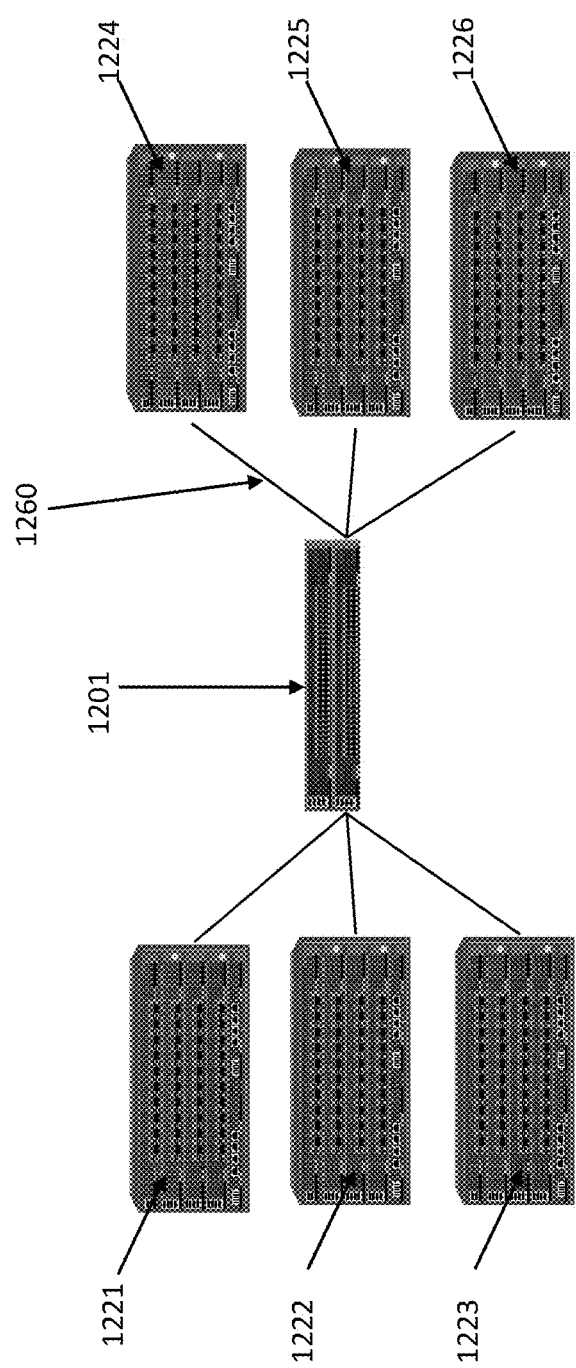
FIG. 12 shows a PassCOM connecting multiple nodes according to aspects of the present disclosure.

FIG. 12 shows an example of a system using a PassCOM to connect multiple nodes. PassCOM 1201 connects nodes 1221-1226. Every link group 1260 connects a single node to PassCOM 1201. Including a loopback loop, or a loop to itself, this configuration requires N links per link group 1260 between a node and PassCOM 1201. For example, in FIG. 12 each link group 1260 includes 5 links. In sum, there are at least $N^2$ links in the system. It is possible to use more than N links per link group in order to improve overall bandwidth and resiliency. The physical arrangement of links, however, is simpler because all of the links are connected to a central hub in the form of PassCOM 1201.

Figure 13:
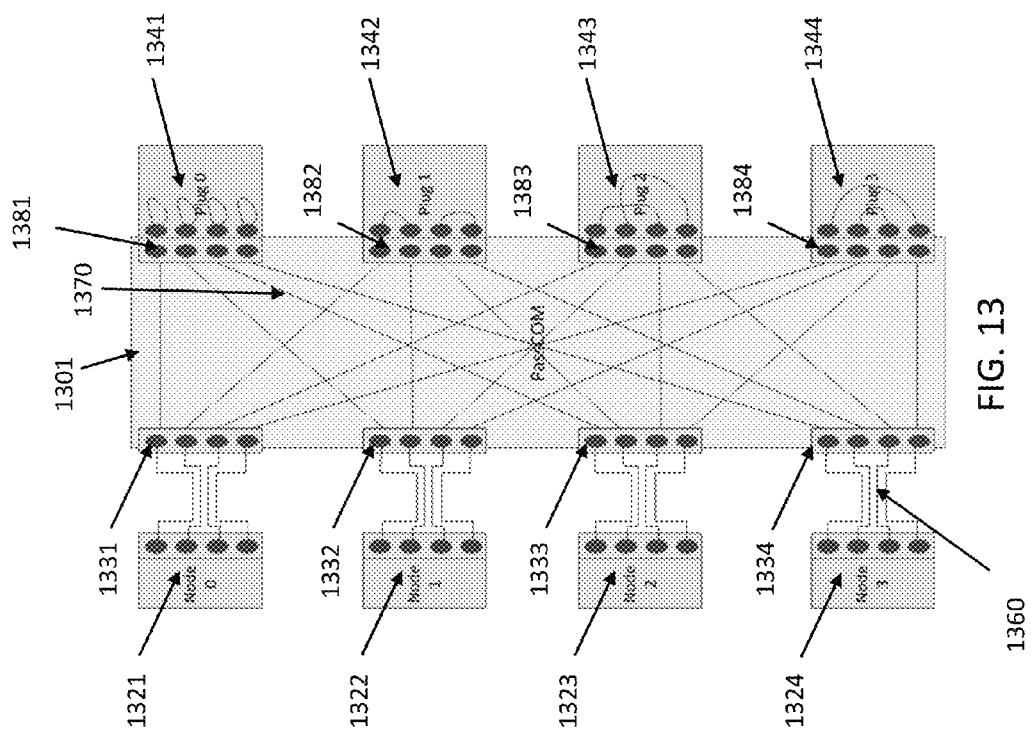
FIG. 13 shows an internal link arrangement of a PassCOM connecting multiple nodes according to aspects of the present disclosure.

A PassCOM can include N front-end connectors, K plugs, K back-end connectors, and internal optical fibers connecting the front-end connectors and the back-end connectors. FIG. 13 shows PassCOM 1301 connecting four nodes 1321-1324. PassCOM 1301 contains four front-end connectors 1331-1334, and external link group 1360 connect the nodes to their corresponding front-end connectors. Internal links 1370 connect each of front-end connectors 1331-1334 to each of back-end connectors 1381-1384. Back-end connectors 1381-1384 receive replaceable plugs 1341-1344. The plug-set composed of replaceable plugs 1341-1344 provides connections to the identified front-end connectors.

Plug 1341 provides loopback connections. In some cases it is important to keep the same delay across all possible paths. Loopback connectivity can make all paths exactly the same. A node can either send data to itself internally or send the data through a PassCOM. When the node send the data to itself internally, the node must implement a separate logic for sending the data to itself. Furthermore, the latency for receiving the data internally is different from the latency for receiving the data through a PassCOM. Also, the internal loop may require additional wires, a multiplexer, a demultiplexer, and memories to handle potential congestion. Thus, it may be easier to send all the data to a PassCOM and have the PassCOM route back through loopback connection. Plug 1342 connects two front-end connectors 1331 and 1332 and also connects two front-end connectors 1333 and 1334. Plug 1343 connects two front-end connectors 1331 and 1333 and also connects two front-end connectors 1332 and 1334. Similarly, plug 1344 connects two front-end connectors 1331 and 1334 and also connects two front-end connectors 1332 and 1333.

According to aspects of the present disclosure, each front-end connector is connected to each of the back-end connectors. In this way, all nodes can be connected in full mesh in the most balanced way. For example, when one plug is disconnected, each node loses the same number of link connections. For PassCOM 1301, each node loses one connection when any given plug is removed. Therefore, there is balanced bandwidth degradation for each node.

Although the physical connectivity is partially lost due to plug disconnection, the logical connectivity (i.e., the capability of sending packets between nodes) still exists due to two hops switching method.

According to aspects of the present disclosure, a plug-set of K plugs 1341-1344 physically connects nodes in a full-mesh topology. All node-to-node connections may have equal bandwidth or different bandwidths. In addition, each connection may use the same number of links 1370 or different number of links to connect a pair of nodes.

PassCOM 1301 has the same number of front-end connectors, back-end connectors, and plugs. However, a PassCOM is not limited to such configuration. A PassCOM can have any number of front-end connectors, back-end connectors, and plugs.

In an embodiment, bundles of receiving and transmitting links from all nodes in the system are connected to front-end PassCOM connectors. The plug-set connects one or more transmitting links from one node to the same number of receiving links in another node. The receiving and transmitting links can be optical fibers. The internal links can also be optical fibers. The receiving and transmitting links are divided into K groups, and the internal links connect each group of receiving and transmitting links to its corresponding K plugs.

A PassCOM can be used with an internal inter-node switching system, where each node is capable of sending data to another node. A source node may send data through a particular transmitting link, which is connected to a receiving link of another node.

One advantage of a PassCOM is its simple upgrade process. When increasing the number of nodes, an operator can connect new nodes to an existing PassCOM by connecting links from the new nodes to front-end connectors of the PassCOM. Because all of the links are connected to the Pass-COM and not to individual nodes, the process of wiring is simple. Because changing a plug-set changes the PassCOM's connectivity, The internal links are statically connected. In other words, the internal links remains the same.

The upgrade process may require replacing plugs because a PassCOM may use a different plug-set for connecting different number of nodes. Having more links connecting any two nodes can increase the bandwidth of the system. In a full mesh connectivity, the ratio $$\frac{M \times C_L}{C_N}$$

is the local over-speed where M is the number of available links in the system, $C_L$ is the capacity of a link, and $C_N$ is the capacity of a node (i.e., processing capacity plus average transit capacity). When the local over-speed is higher than 1, the system is capable of handling the full processing capacities of its node. It is desirable to keep the local over-speed higher than a threshold number that is larger than 1.

When the link capacity is large or the node capacity is small such that the local over-speed is larger than 1, upgrading or downgrading a system scale (i.e., the number of nodes) can be done with only partial traffic loss or no loss. This traffic loss will be depend on the value of M.

Figure 14A:
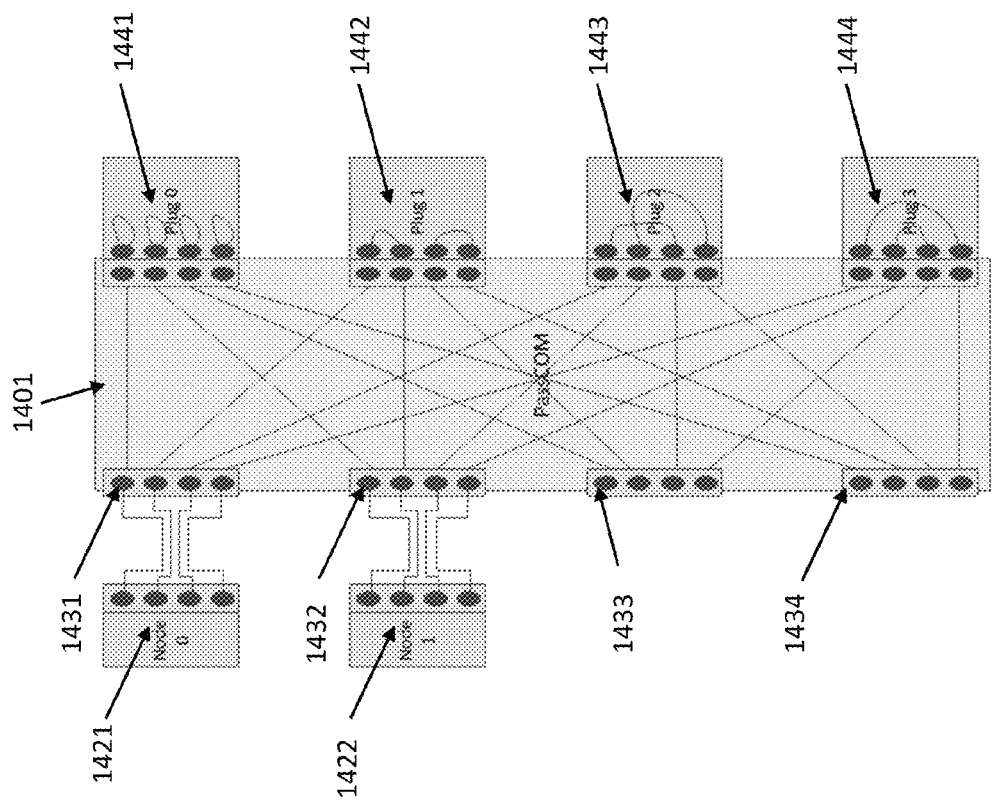
FIG. 14A shows an internal link arrangement of a PassCOM connecting two nodes with plugs designed to connect four nodes according to aspects of the present disclosure.

FIG. 14A shows a PassCOM with the plug-set—plugs 1441-1444—that is identical to the plug-set with plugs 1341-1344 as used in FIG. 13, but connecting two nodes. Two nodes 1421 and 1422 are connected to two front-end connectors 1431 and 1432, respectively. Among plugs 1441-1444, only plug 1442 provides connection between node 1421 and node 1422. Also, plug 1441 is the only plug providing loopback connection.

Figure 14B:
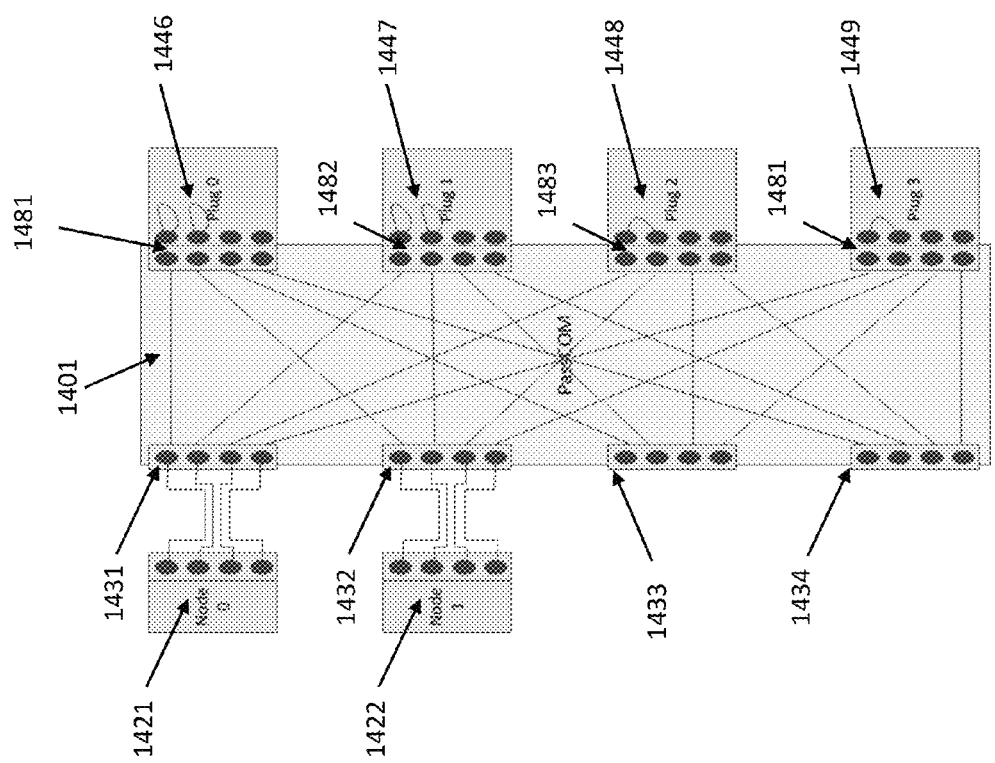
FIG. 14B shows an internal link arrangement of a PassCOM connecting two nodes with plugs designed to connect two nodes according to aspects of the present disclosure.

In contrast, FIG. 14B illustrates a PassCOM with a different plug-set: plugs 1446-1449. In this example, the plug-set is defined in such a way that two nodes 1421 and 1422 are connected to each other by two links and each node has two loopback links. Two nodes 1421 and 1422 are connected to two front-end connectors 1431 and 1432, respectively. Among plugs 1446-1449, two plugs 1448 and 1449 connect node 1421 and node 1422, doubling the bandwidth. In this setting, two plugs 1446 and 1447 allow loopback connection.

The example is shown with the PassCOM with two front-end connectors, N=2, and four back-end connectors, K=4. However, any combination of N and K is possible for N less than K. Even when N is smaller than K, or when the number of nodes are smaller than the number of back-end connectors, the same overall interconnect bandwidth can be achieved by connecting pairs of nodes by more than one link as shown in FIG. 14B.

Depending on the minimum required bandwidth between the nodes, it is possible to connect nodes with a smaller number of connections. For instance, if the bandwidth of one link is sufficient for connecting 1421 and 1421, then using 1441-1444 will provide enough bandwidth. So the PassCOM does not need to use the plug-set with plugs 1446-1449.

When adding nodes, in addition to existing nodes 1421 and 1422, to PassCOM 1401 with plugs 1446-1449, an operator would change the plugs. Front-end connectors 1433 and 1434 are not connected to front-end connectors 1431 and 1432 because the plug-set with plugs 1446-1449 are designed to connect two nodes. As a result, newly introduced nodes will not be connected to existing nodes 1421 and 1422. Instead, the plug-set with plugs 1441-1444 can be used when adding nodes.

Router with PassCOM and Distributed Switchless Switching

A benefit of using a PassCOM on a distributed switchless interconnect system is that the system can be upgraded without a major interruption in the traffic when indirect transfer of data is allowed. First, an operator may send a command to all nodes to stop using the links connected to the plug that will be replaced. After the operator replaces the plug, the operator may send a command to all nodes to start using the links.

On a traditional full mesh network, traffic using the upgraded connection will be stopped during the upgrade process. However, in the proposed distributed switchless system allowing multi-hop transfer, the traffic can continue to flow. First, new nodes are connected to front-end connectors of a PassCOM. As plugs in the PassCOM are replaced, traffic using the plug being replaced are rerouted through the new nodes as intermediate nodes.

A PassCOM can operate with fewer number of large plugs (i.e., plugs with a larger number of connections), more number of small plugs (i.e., plugs with a smaller number of connections), or in combination of small and large plugs. The same connectivity can be achieved regardless of the size of the plugs. However, during a system upgrade (i.e., adding or removing a node), there is a trade-off for using different sized plugs. When a plug is removed, the system loses $1/K^{th}$ portion of the bandwidth. While the plug is unavailable, the system uses $(K-1)/K^{th}$ portion of the full bandwidth. If a large plug is used, or if the number of plugs, K, is small, then the bandwidth reduction is large. However, using large plugs to connect more links requires a smaller number of steps to complete the upgrade. The opposite is true when using small plugs. When replacing small plugs, bandwidth reduction is small, but the number of steps for upgrading the system is larger due to larger number of required operations.

Figure 15:
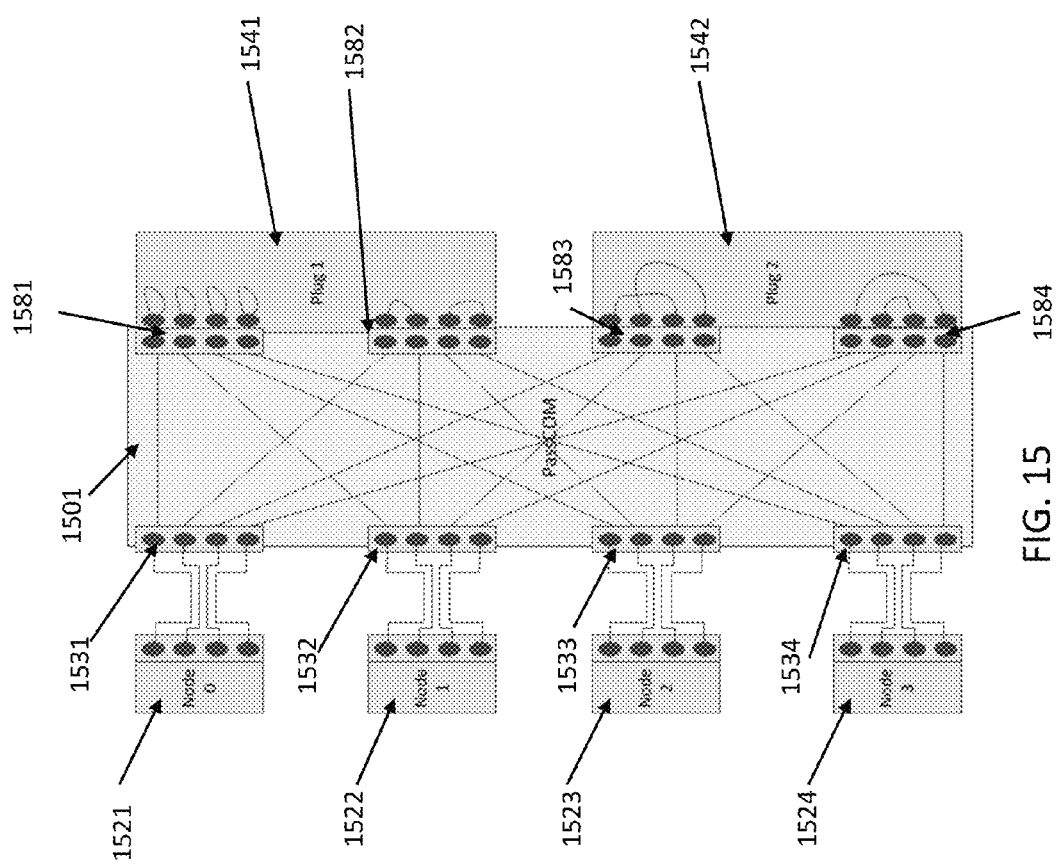
FIG. 15 shows an internal link arrangement of a PassCOM connecting four nodes with two plugs according to aspects of the present disclosure.

FIG. 15 shows PassCOM 1501 with large plugs 1541 and 1542. The connection is identical to PassCOM 1301 with plugs 1341-1344 in FIG. 13, but plugs 1541 and 1542 individually connect twice as many links as individual plugs 1341-1344. As shown in FIG. 15, large plugs may be plugged with a larger number of connections. Plug 1541 is plugged into back-end connectors 1581 and 1582, and plug 1542 is plugged into back-end connectors 1583 and 1584. In this example, two back-end connectors receive one plug. However, more than two back-end connectors may receive one plug.

Figure 16:
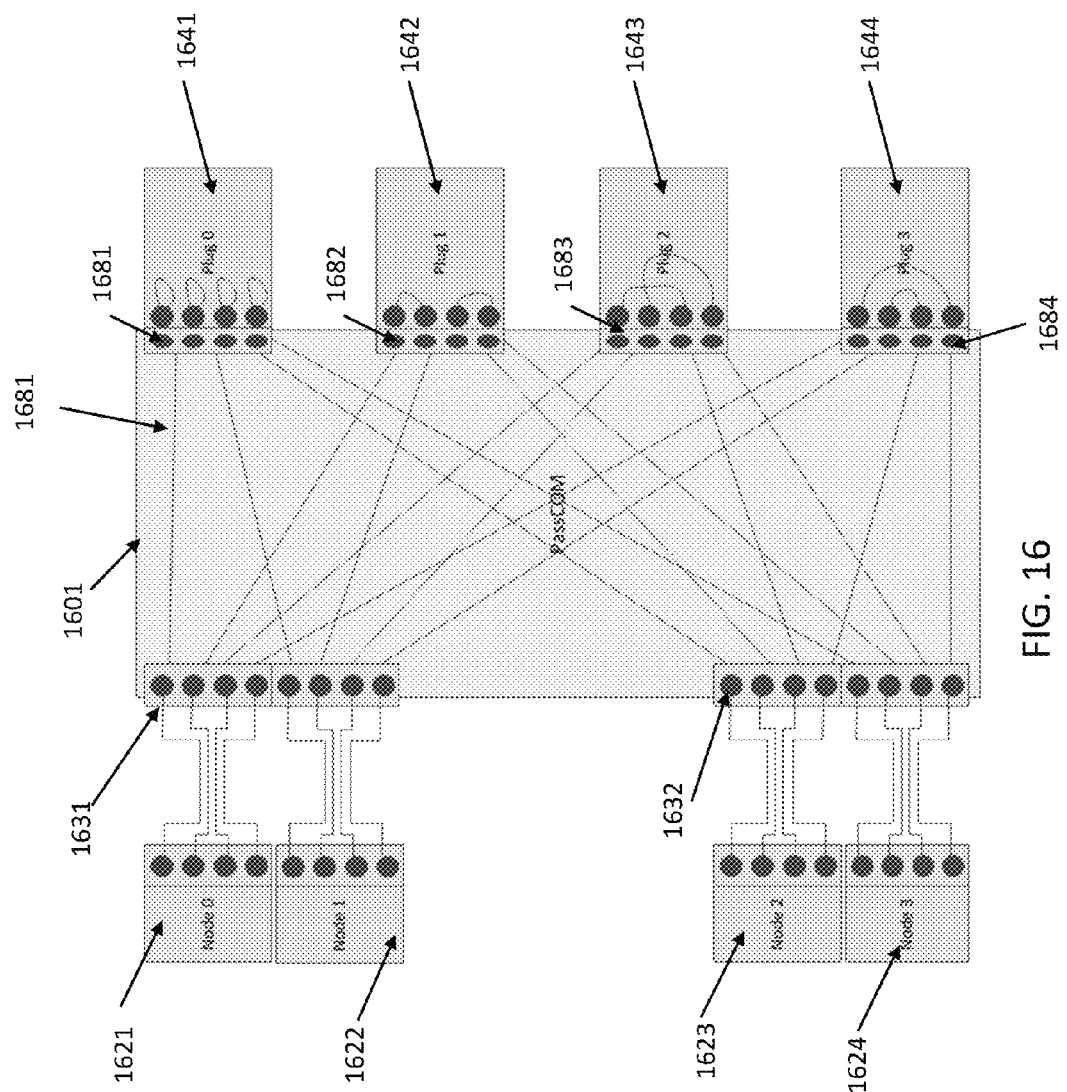
FIG. 16 shows an internal link arrangement of a PassCOM connecting four nodes with two front-end connectors and four back-end connectors according to aspects of the present disclosure.

FIG. 16 shows PassCOM 1601 with two front-end connectors 1631 and 1632 connecting four nodes 1621, 1622, 1623, and 1624. In this case, each connector connects two nodes. However, the present disclosure is not limited to the configuration shown in the figure. Any combination of front-end connectors and nodes is possible. As presented, the number of nodes can be smaller than the number of front-end connectors. Alternatively, the number of nodes can be larger than the number of front-end connectors.

Figure 17:
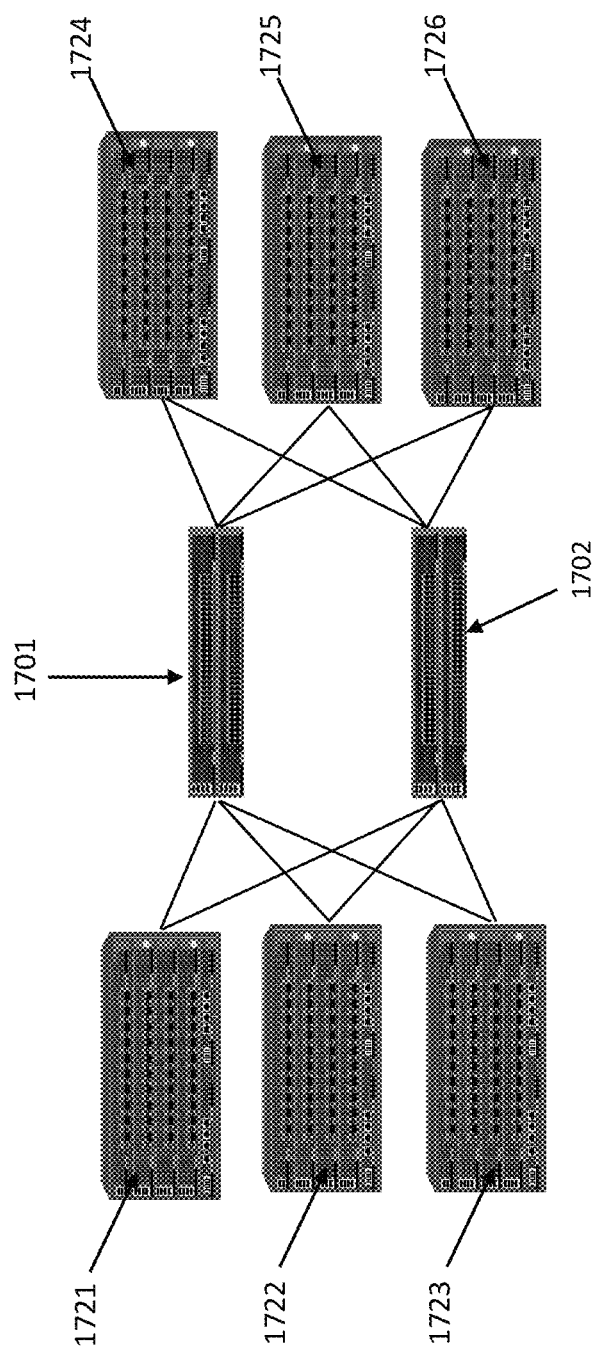
FIG. 17 shows two PassCOMs connecting multiple nodes according to aspects of the present disclosure.

The failure probability of a PassCOM is low because it has passive components. However, to further protect the system from PassCOM failures, connectivity can be split into multiple PassCOMs, up to the number of plugs. In an embodiment, all nodes are connected to two or more PassCOMs. FIG. 17 shows nodes 1721-1726 connected to PassCOMs 1701 and 1702.

Figure 18:
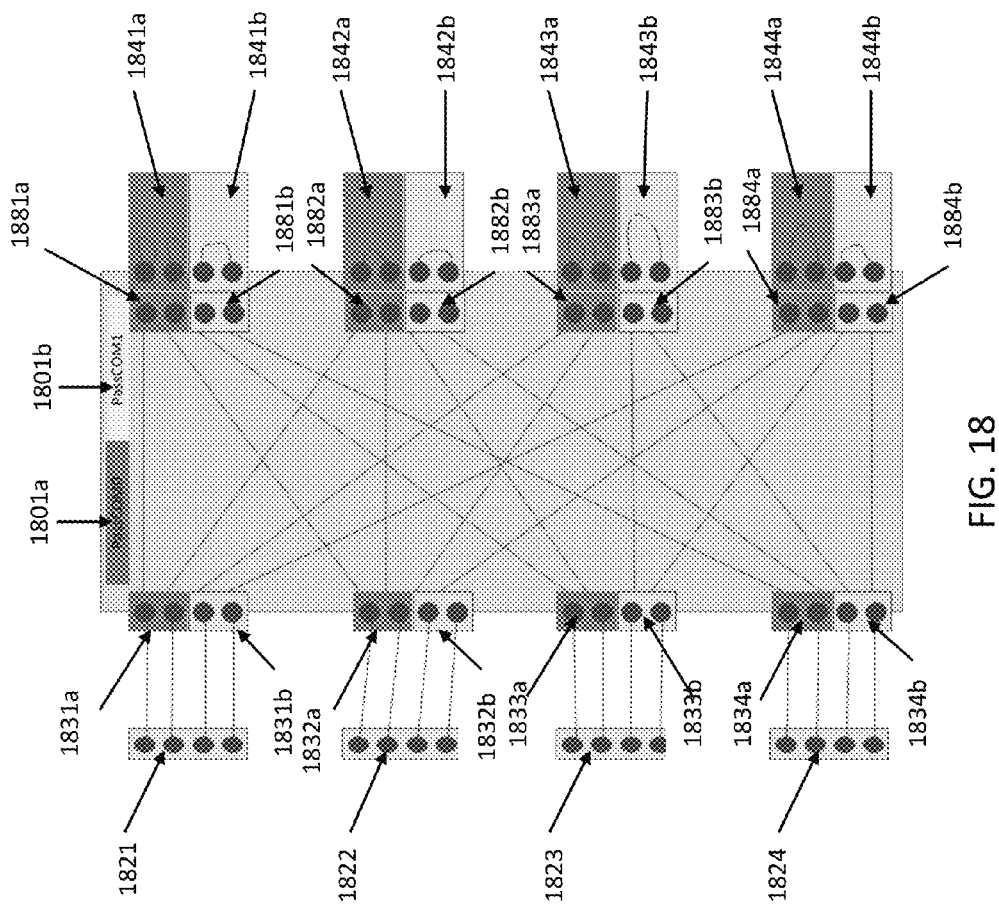
FIG. 18 shows an internal link arrangement of two PassCOMs connecting multiple nodes according to aspects of the present disclosure.

FIG. 18 shows a logical view of how links are connected between front-end connectors and plugs in PassCOMs 1801a and 1801*b*. Each front-end connectors are connected to two front-end connectors from two PassCOMs. For example, nodes 1821, 1822, 1823, and 1824 are connected to two front-end connectors 1831*a* and 1831*b*, 1832*a* and 1832*b*, 1833*a* and 1833*b*, and 1834*a* and 1834*b*, respectively. The internal links in PassCOM 1801*a* connect front-end connectors 1831*a*-1834*a* to back-end connectors 1881*a*-1884*a*. Similarly, the internal links in PassCOM 1801*b* connect front-end connectors 1831*b*-1834*b* to back-end connectors 1881*b*-1884*b*.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

What is claimed is:

1. A method of processing data in a full mesh distributed switchless interconnect system comprising:
   receiving by a first processing engine in a full mesh distributed switchless interconnect system including a plurality of processing engines wherein each of the processing engines in the interconnect system includes a direct switchless connection to each other processing engine, first data indicating a first destination processing engine;
   determining by the first processing engine that the first processing engine is the first destination processing engine in the full mesh distributed switchless interconnect system and processing the first data by the first processing engine based on determining that the first processing engine is the first destination processing engine;
   receiving, by the first processing engine, second data indicating a second destination processing engine;
   determining by the first processing engine that the first processing engine is not the second destination processing engine;
   evaluating an availability of the direct switchless connection between the first processing engine and the second destination processing engine in the full mesh distributed switchless interconnect system; and
   transmitting the second data to an intermediate processing engine based on a result of the evaluation of the availability of the direct switchless connection indicating the direct switchless connection is not available.

2. The method of claim 1, wherein the first data comprises at least one master cell which comprises at least one packet.

3. The method of claim 2, wherein the at least one master cell contains a header with a queue sequence number.

4. The method of claim 3, wherein processing the first data comprises:
   ordering the at least one master cell based on the queue sequence number;
   extracting the at least one packet; and
   sending the at least one packet to a processing unit coupled to the first processing engine.

5. The method of claim 1, further comprising forming by the first processing engine at least one master cell comprising at least one packet.

6. The method of claim 5, further comprising determining a size of the master cell based on at least one of a link capacity, a processing engine capacity, a number of links, and a number of intermediate processing engines.

7. The method of claim 5, wherein forming comprises adding packets to the at least one master cell until a timeout parameter expires.

8. The method of claim 5, wherein forming comprises adding the at least one packet to the at least one master cell based on an amount of available packets and an urgency of delivery.

9. The method of claim 1, further comprising
   forming by the first processing engine a plurality of master cells from third data received from a processing unit coupled to the first processing engine, wherein the plurality of master cells contains different packets; and
   transmitting the plurality of master cells to a plurality of intermediate processing engines.

10. The method of claim 1, further comprising:
    broadcasting by the first processing engine that a first link coupling the first processing engine to a second processing engine is inactive, if the first processing engine fails to receive a keepalive message from the second processing engine.

11. The method of claim 1, further comprising:
    sending by the first processing engine a first keepalive message to a second processing engine;
    broadcasting by the first processing engine that a first link coupling the first processing engine to the second processing engine is inactive, if the first processing engine fails to receive a message from the second processing engine in response to the first keepalive message.

12. The method of claim 1, further comprising:
    sending by the first processing engine a first keepalive message to a second processing engine;
    broadcasting by the first processing engine that a first link coupling the first processing engine to the second processing engine is inactive, if the first processing engine receives a message from the second processing engine indicating a failure to receive the first keepalive message.

13. In a full mesh distributed switchless interconnect system, an apparatus comprising:
    a processing unit; and
    a first processing engine coupled to the processing unit and having a direct switchless connection to each other processing engine of a plurality of other processing engines comprising the full mesh distributed switchless interconnect system, wherein the first processing engine is configured to receive via the full mesh distributed switchless interconnect system first data indicating a first destination processing engine;
    wherein the first processing engine is configured to determine that the first processing engine is the first destination processing engine and to deliver the first data to the processing unit based on the determination that the first processing engine is the first destination processing engine; and
    wherein the first processing engine is further configured to:
    receive via the full mesh distributed switchless interconnect system second data indicating a second destination processing engine,
    determine that the first processing engine is not the second destination processing engine,
    evaluate an availability of the direct switchless connection between the first processing engine and the second destination processing engine in the full mesh distributed switchless interconnect system, and transmit the data to an intermediate processing engine in the full mesh distributed switchless interconnect system based on a result of the evaluation of the availability of the direct switchless connection between the first processing engine and the second destination processing engine.

14. The apparatus of claim 13, wherein the first processing engine comprises an assembly unit configured to form at least one master cell comprising at least one packet based on third data received from the processing unit.

15. The apparatus of claim 14, wherein the first processing engine is configured to transmit the at least one master cell to a plurality of intermediate processing engines.

16. The apparatus of claim 13, wherein the first processing engine comprises a re-ordering unit configured to reorder at least one master cell received from a second processing engine and de-assemble the received master cell to at least one packet.

17. The apparatus of claim 13, wherein:
the first processing engine is configured to broadcast that a first link coupling a second processing engine to the first processing engine is inactive if the first processing engine fails to receive a keepalive message from the second processing engine.

18. The apparatus of claim 13, wherein:
the first processing engine is configured to transmit a first keepalive message to a second processing engine;
the first processing engine is configured to broadcast that a first link coupling the first processing engine to the second processing engine is inactive if the first processing engine fails to receive a message from the second processing engine in response to the first keepalive message.

19. The apparatus of claim 13, wherein:
the first processing engine is configured to transmit a first keepalive message to a second processing engine;
the first processing engine is configured to broadcast that a first link coupling the first processing engine to the second processing engine is inactive if the first processing engine receives a message from the second processing engine indicating a failure to receive the first keepalive message.

20. The method of claim 1, further comprising:
receiving by the first processing engine a plurality of packets from a processing unit coupled to the first processing engine, each packet being associated with a different destination processing engine; and
for each packet of the plurality of packets:
determine whether the packet exceeds an available length of a master cell associated with the destination processing engine associated with the packet,
when the packet does not exceed the available length, adding the packet to the master cell, and
when the packet does exceed the available length, transmitting the master cell, building a new master cell, and adding at least a portion of the packet to the new master cell.

21. The apparatus of claim 13, wherein the first processing engine is further configured to:
receive from the processing unit a plurality of packets, each packet being associated with a different destination processing engine; and
for each packet of the plurality of packets:
determine whether the packet exceeds an available length of a master cell associated with the destination processing engine associated with the packet,
when the packet does not exceed the available length, add the packet to the master cell, and
when the packet does exceed the available length, transmit the master cell, build a new master cell, and add at least a portion of the packet to the new master cell.

* * * * *